Aug. 24, 1943.  E. D. LILJA  2,327,357

VOLTAGE REGULATOR SYSTEM

Filed June 8, 1940

INVENTOR
Edgar D. Lilja
BY
Parker, Carlson, Pitzner, Hubbard
ATTORNEYS

Patented Aug. 24, 1943

2,327,357

UNITED STATES PATENT OFFICE 2,327,357

VOLTAGE REGULATOR SYSTEM

Edgar D. Lilja, Rockford, Ill., assignor to Barber-Colman Company, Rockford, Ill., a corporation of Illinois Application June 8, 1940, Serial No. 339,454

13 Claims. (Cl. 171—119)

The invention relates to improvements in voltage regulator systems and, more particularly, to such systems for regulating alternating potentials.

One object of the present invention is to provide a novel system of the character indicated which, though sensitive and accurate in operation, is especially rugged in construction, the latter characteristic being attributable in large measure to the fact that no vacuum tubes, sensitive relay contacts or similar switch parts are required.

Another object is to provide such a system which is responsive to very small deviations in potential from a selected normal value.

Another object is to provide a novel system of the type indicated in which the speed of response of the controlling mechanism is automatically varied in proportion to the magnitude of the voltage deviation to be corrected.

Still another object is to provide a novel voltage regulator system which remains undisturbed by transient or short duration variations in the controlled voltage but is effective to correct sustained changes.

The invention also resides in various improvements and simplifications in the circuit arrangement of the system by virtue of which low cost and simplicity are achieved without sacrifice in sensitivity and efficiency of operation.

Figure 1:
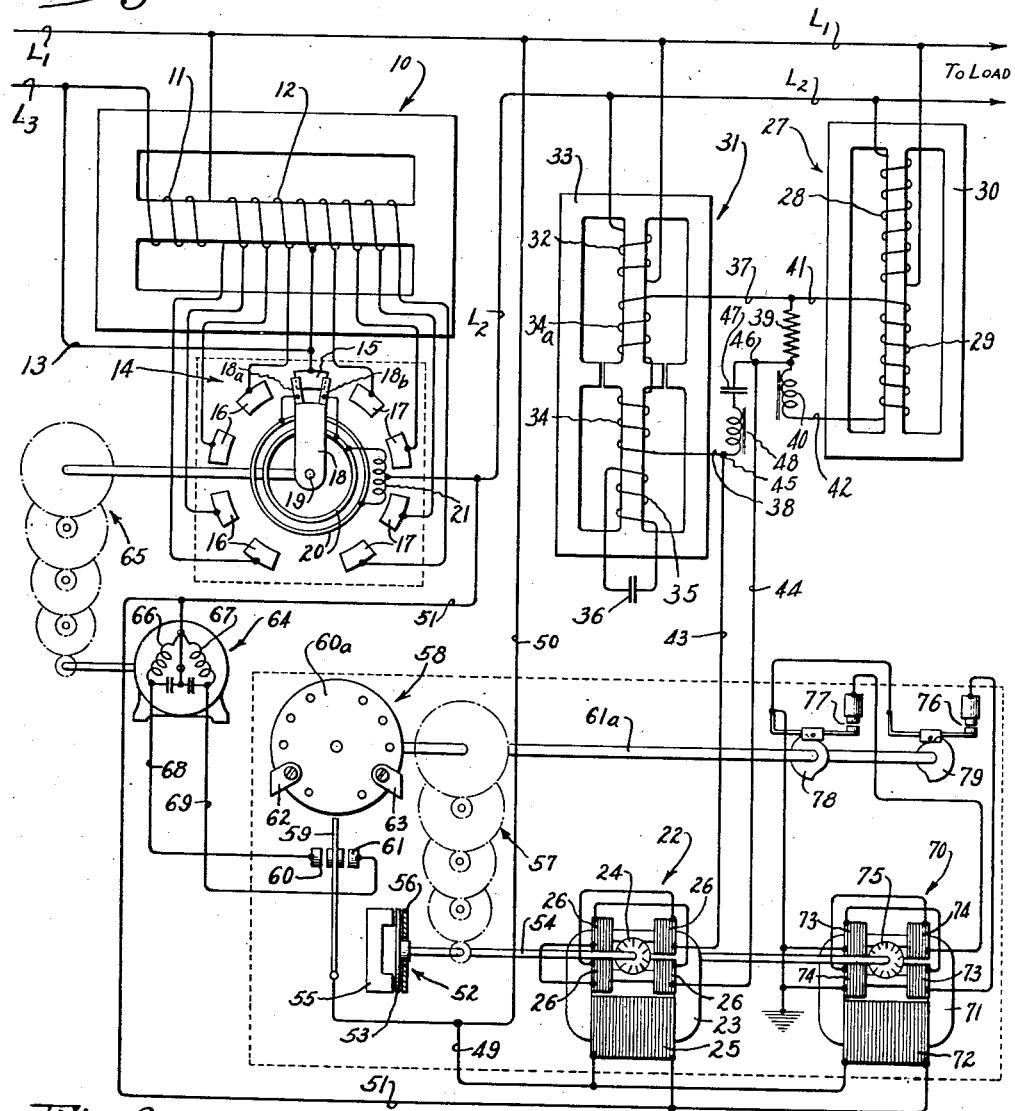

Further objects and advantages of the invention will be come apparent as the following description proceeds, taken in connection with the accompanying drawing, in which Figure 1 is a schematic wiring diagram of a voltage regulator system embodying the invention.

Figure 2:
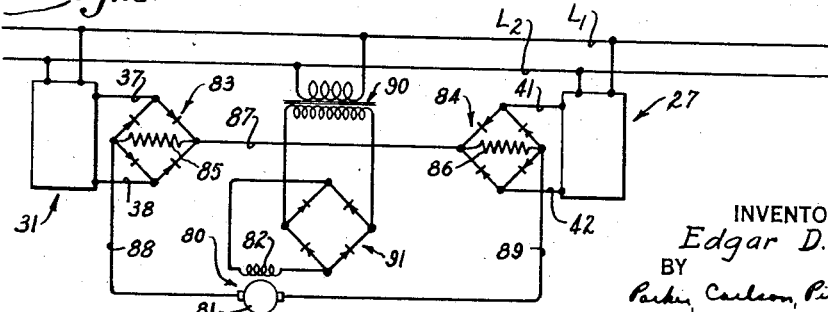

Fig. 2 is a wiring diagram of a modified form of system embodying the invention.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Voltage regulating systems embodying the present invention may be arranged to operate through various well known forms of voltage control devices such, for example, as those which operate directly on the generator or other source of voltage for a network or those which alternatively operate to change the voltage in the network independently of the source. The improved control system, as shown in Fig. 1, is adapted to adjust automatically the setting of a control device of the latter type, namely a compensating auto-transformer, designated generally as 10. Changes in the setting of a tap-changing switch on this transformer 10 serve, in general, to vary the potential applied to output leads $L_1$ and $L_2$ from a suitable source of alternating current (not shown) connected to $L_1$, $L_3$.

Compensating auto-transformers like 10 are well known in the art and, consequently, simply a brief identification of its parts will suffice. The input or primary section 11 of the transformer windings is connected directly across the input leads $L_1$, $L_3$. The center point on the other or secondary section 12 of the transformer windings is connected to the supply line $L_3$ through a conductor 13. Consequently, by connecting selected portions of the secondary winding 12, lying on one side or the other of its center point, to the output lead $L_2$, the voltage induced in the selected portion of the winding 12 is either added to or subtracted from the source voltage between $L_1$, $L_3$ so that the voltage between $L_1$ and $L_2$ is correspondingly changed. For purposes of the present description, it will be assumed the connections are such that connecting in turns of the winding 12 on the right hand side of its center point raises the output voltage and that connecting in turns on the left hand side lowers it.

A rotary tap-changing switch mechanism 14 serves to change the setting of the transformer 10. For this purpose, the switch mechanism includes a center contact 15, connected to the center tap on the winding 12, as well as a series of contacts 16 and 17 arranged at opposite sides of the center contact 15 and connected to respective taps along the winding 12. A rotary slider arm 18, pivoted at 19, can be rotated into engagement with any one of the contacts 15, 16, 17. From this slider 18, carrying insulated contact shoes 18a and 18b, a connection is established to the output line $L_2$ through a pair of collector rings 20 on which the slider contact shoes run. These collector rings 20 are connected to preventive auto-transformer 21, whose center tap is connected to the output lead $L_2$. By providing this double contact arrangement, interconnected by the auto-transformer 21, short-circuiting of adjacent switch contacts in the tap-changing switch is prevented as the switch arm 18 passes from one contact to the next, the voltage between adjacent contacts being safely absorbed.

In accordance with the present invention, the tap-changing switch 14 is actuated by means including a reversible electric motor which, in the form shown in Fig. 1, is of the shaded pole induction type indicated at 22. The motor comprises a core type stator 23 defining a recess in which is located a rotatable armature 24. On the stator is a main winding 25 constantly energized from an alternating source such as the lines $L_1$ and $L_2$ and inductively coupled with four shading or quadrature windings 26, which are distributed about the rotor recess and connected in series relation in the present instance. This motor may be started and maintained in operation by applying an energizing potential to the shading windings 26 out of phase with respect to that applied to the main winding 25. The direction of rotation of the rotor 24 is dependent upon this phase relation, and the speed and torque are dependent upon the degree of energization of the windings 26. Therefore, by alternatively applying one or the other of two potentials to the windings 26, which are respectively leading and lagging in phase with relation to the main winding potential, the motor 22 can be caused to rotate in corresponding opposite directions.

The present invention contemplates energization of the windings 26 by a potential the phase of which is changed automatically in accordance with whether the controlled voltage of the network lines $L_1$, $L_2$ is above or below normal, thereby causing the motor 22 to run in a direction proper to change the setting of the control device 10 in a sense to restore the controlled voltage to normal.

To derive a suitable potential for application to the motor shading windings 26 for operation of the motor as indicated above, the algebraic sum of two phase-opposed potentials is used. One of these potential components is proportional to the voltage across the lines $L_1$, $L_2$. The other of the potential components is of a preselected fixed value and is equal to the first mentioned potential component when the controlled voltage across $L_1$, $L_2$ is at its selected normal value.

As a source for the first or variable potential component noted above, a constant ratio transformer 27 is used. This transformer is of conventional form and comprises a primary winding 28, connected across lines $L_1$, $L_2$ and inductively coupled with a secondary winding 29 through a core 30. The source for the second or fixed potential component comprises a second transformer 31. This transformer is, however, of the constant voltage type also of conventional though somewhat less common form. It comprises a primary winding 32, energized from the controlled network supply lines $L_1$, $L_2$, and inductively coupled through a high leakage-reactance magnetic circuit or core 33 with a secondary winding 34, connected in series with a compensating winding 34ª. Also wound on the core 33 is an intermediate or resonant winding 35 having a condenser 36 connected across it and tuned to resonance at the line frequency. This transformer 31 operates in the usual manner to produce a constant output voltage between its output leads 37, 38 irrespective of fluctuations of the input voltage applied to its primary winding 32.

The outputs of the two transformers 27 and 31 are connected together in phase opposition and the algebraic sum of the output potentials is applied as an energizing potential to the shading windings 26 of the motor 22. To this end, a network is provided including a resistor 39 connected in series with an inductive reactor 40 across the output leads 41, 42 of the transformer 27. As a result, the current through the resistor 39 lags the voltage induced in the secondary winding 29, as does the resultant voltage drop through the resistor 39. The amount of lag is adjusted so that the voltage drop through the resistor 39 will be exactly 180 electrical degrees out of phase with the lagging output voltage between the leads 37, 38 of the constant voltage transformer 31. It is necessary to use the lagging device 40 in the output of the transformer 27 since it is an inherent characteristic of a constant voltage transformer like the transformer 31 that its output voltage lags the input voltage by more than 180 electrical degrees. By connecting the motor shading windings 26 through leads 43 and 44, with points 45 and 46 in the network shown, the potential across these leads 43, 44 will be the algebraic sum of the phase-opposed potential components noted above, namely, the output potential of the transformer 31 and the voltage drop across the resistor 39. As a precaution against saturation of the poles of the motor 22 by the strong third harmonic output peculiar to transformers like the transformer 31, a by-pass is provided in the form of a condenser 47 and reactor 48 connected between the leads 43, 44 and tuned to series resonance for the third harmonic.

It will be observed that with the arrangement described above, if the voltage between the load lines $L_1$, $L_2$ is at its preselected normal value, the two phase-opposed potential components applied to the motor supply lines 43, 44 will exactly balance each other so that no voltage is applied to the motor shading windings 26. As a result the motor 22 remains at rest. If, however, the controlled voltage on the lines $L_1$, $L_2$ drops below normal, the potential component derived from the transformer 31 will exceed that derived from the transformer 27 so that the difference between these two components is applied to the motor windings 26. Similarly, if the controlled voltage rises above normal, the component derived from the transformer 27 will exceed that derived from the transformer 31 so that their difference will again be applied to the motor windings 26, but in this instance the applied potential will be 180 degrees out of phase with respect to that in the instance first noted. In either case, the phase of the voltage applied to the shading windings will be that of the predominating voltage and the motor will be caused to rotate in a corresponding direction. In particular, the main winding 25 is connected across the lines $L_1$, $L_2$ with the terminal of the winding connected to supply line $L_1$ through conductors 49, 50 and the other terminal connected to line $L_2$ through conductor 51. Therefore, the motor 22 is caused to rotate in, say, a clockwise direction when the controlled voltage on lines $L_1$, $L_2$ exceeds its preselected normal value and to rotate in the opposite or counter-clockwise direction when the controlled voltage is deficient. It will thus be seen that the direction of rotation for the motor 22 is determined directly by swings above or below normal in the controlled voltage on the lines $L_1$, $L_2$, so that this motor rotation can be used to change the setting of the tap-changing switch 14 for restoring the controlled voltage to normal. Moreover, the torque exerted by the motor 22 is directly proportional to the magnitude of the voltage applied to its shading windings 26 so that the greater the deviation from that controlled voltage, the more rapid will be the operation of the motor 22 in changing the setting of the control transformer 10 for restoring the controlled voltage to normal.

It has been found that better control of the motor 22 may be obtained by applying a load which varies in accordance with the speed. For this purpose, an eddy current brake 52 is utilized. As shown, this brake comprises a non-magnetic electrically-conductive rotor disk 53 fast on the motor shaft 54 and arranged to rotate across the poles of a stationary permanent magnet 55. The magnetic circuit is completed by a stationary magnetic member 56. The flux in the magnetic circuit, linking the disk 53, sets up eddy currents in the disk which in turn introduce a mechanical reaction which opposes the motion of the disk. This reactive or braking force increases in proportion to the speed.

Means is provided for introducing a time delay action in the system so that the setting of the tap-changing switch 14 will only be changed in the event of a sustained deviation from normal in the controlled voltage, thereby eliminating hunting in the event of transient variations in the controlled voltage. For this purpose, the motor 22 is arranged to drive, through a speed reduction gearing 57, a time delay contactor 58. This contactor comprises a reversing switch including a cantilever spring mounted center contact 59 engageable alternatively with side contacts 60 and 61. The actuator for this reversing switch comprises a disk 60ª on a rotatable shaft 61ª driven from the gear train 57. On the disk 60ª are stops 62 and 63 engageable alternatively with the reversing switch center contact 59 to swing the latter alternatively into engagement with contacts 61 and 60, depending upon the direction of disk rotation. A plurality of mounting holes are provided on the disk for the stops 62, 63 so that their angular position about the disk periphery can be changed at will, thereby varying the time interval of rotation for the disk required before they engage the reversing switch to actuate the same.

The time delay contactor 58 described above in turn controls the energization of a reversible capacitor motor 64 which is arranged to drive the tap-changing switch slider 18 through a speed reduction gearing 65. The motor 64 has the usual alternatively energizable windings 66, 67 connected at one end through a common terminal with the conductor 51 and thence to the line L₂. The opposite end terminals of windings 66, 67 are alternatively connected to the other line L₁ through respective conductors 68, 69, the reversing switch contacts 59 and 60 or 61, and conductor 50.

In the present instance, restoration of the time delay contactor 58 to its initial or neutral position, after the controlled voltage has been restored to normal, is effected by a separate motor 70 having its rotor on the shaft 54 of the main motor 22. The motor 70 is also a shaded pole motor of the same general form as the driving motor 22, but is adapted to exert a substantially lesser torque. It also includes a core type stator 71 on which are two sets of shading windings 73, 74 and a main winding 72 which may be constructed with a larger number of turns than the winding 25 of the main motor so as to obtain the desired decrease in torque. The main winding 72 is energized from the lines L₁, L₂ in parallel with the corresponding winding of the main motor through conductors 49, 50 and 51. In the case of the resetting motor 70, however, the sets of shading windings 73, 74 are alternatively short-circuited to cause it to exert a torque in one direction or the other.

A pair of cam actuated switches 76, 77 serve respectively to short-circuit the sets of shading windings 73, 74 of the resetting motor. These switches are actuated respectively by cams 79 and 78 fast on the time delay contactor shaft 61ª. The cams are contoured so that both switches 76, 77 will be open when the time delay contactor 58 is in its initial or "off" position shown. As soon, however, as the disk 60ª turns in a clockwise direction from this initial position, the cam 78 closes the switch 77 thereby short-circuiting the shading windings 74 so that the resetting motor 70 exerts a torque tending to restore the disk to its initial position. Similarly, upon rotation of the disk 60ª in an opposite or counter-clockwise direction, the cam 79 closes the switch 76, thereby short-circuiting the other set of circuit windings so that the motor 70 tends to operate in the opposite direction and restore the disk 60ª to its initial position. Since the torque of the resetting motor 70 is substantially less than that of the main driving motor 22, the resetting motor will be ineffective to return the contactor disk 60ª to its initial position until the main driving motor 22 is deenergized or, in other words, until the controlled voltage on the lines L₁, L₂ has been restored to normal. As soon, however, as this voltage does return to normal, the resetting motor takes control and runs the contactor disk back to its initial position.

The operation of the regulating system of Fig. 1 will in general be clear from the foregoing description of its elements. As a brief résumé, however, it may be noted that when the input voltage on lines L₁, L₂ is of a normal selected value, the same voltage will appear on the load leads L₁, L₂. In such case the potential components derived from the transformers 27, 31 balance each other so that the main driving motor 22 remains at rest as do the other elements of the system. In the event that the supply voltage drops below normal, the potential component derived from the transformer 27 is exceeded by that derived from the constant voltage transformer 31, and the algebraic sum of these phase-opposed potential components is applied to the shading windings of the main driving motor 22. Thereupon, the motor 22 rotates in a direction to cause the time delay contactor disk to rotate in a counter-clockwise direction. After a time interval, determined by the location of the stop 62 about the periphery of the disk 60ª, this stop pushes the center contact 59 of the reversing switch to the right, thereby closing the contacts 59, 61 so that the capacitor motor 64 is energized to rotate the tap-changing switch slider 18 in a clockwise direction. Thereupon, the voltage induced in successive portions of the secondary winding 12 of the compensating transformer is added to the voltage from the source so that the voltage across the lines L₁, L₂ is progressively increased as the slider 18 reaches successive ones of the contact, 17. This action continues under the predominating influence of the motor 22 over that of the resetting motor 70 until the voltage across L₁, L₂ is restored to normal. Thereupon, the phase-opposed potentials derived from the transformers 27, 31 again exactly balance each other and the main driving motor 22 stops. The resetting motor, now freed of the effect of the main driving motor 22, takes control and rotates the main shaft 54 in the opposite direction until the time delay contactor disk 60ª reaches its initial position. Thereupon, the switch 76 reopens and stops the resetting motor.

In the event that the controlled voltage on the lines $L_1$, $L_2$ drops still further, the operation described above is repeated and still more voltage added from the compensating transformer 10. Similarly, if the controlled voltage rises above normal, the same type of operation takes place but in a reverse sense. In other words, the potential component derived from the transformer 27 would exceed that received from the constant voltage transformer 31 so that the main driving motor 22 would be caused to rotate in an opposite direction to that heretofore described. Hence, the time delay contactor disk 60ª would revolve in a clockwise direction so that its stop 63 would, after a time interval, close the contacts 59, 60 thereby energizing the capacitor motor 64 to turn the tap-changing slider 18 in a counterclockwise direction. After the voltage is restored to normal by such action, the resetting motor 70 returns the main driving motor 22 and time delay contactor 58 to their initial positions due to the short-circuiting of its shading windings 74 by the switch 77.

If the dip or rise in the controlled voltage is of short duration, the voltage will have returned to normal before the time delay contactor 58 has closed its reversing switch contacts. In such case, the resetting motor 70 runs the time delay contactor back to its initial position all without having made any change in the setting of the tap-changing switch 14. In this way, the setting of the main control device is not affected by short duration variations in the controlled voltage and undesirable hunting is eliminated.

From the foregoing, it will be seen that quite a simple control system has been provided and by means of which an actuating device, in the form of the main motor 22, is effectually energized in response to deviations from normal in the controlled voltage, all without the use of any sensitive relays or vacuum tubes. The transformers 27, 31 together with their associated network which control the energization of the main driving motor 22, do not embody any moving parts or contact elements. Consequently, they are not subject to wear or other deterioration and thus are capable of rendering long trouble-free service which is a vital prerequisite in a voltage regulating system. Also, the arrangement is such that deviations in the controlled voltage of even small magnitude will effectually energize the motor 22 to accomplish its correcting operation.

Of special importance in the system described is the provision for proportioning the speed of the voltage correcting operation in accordance with the magnitude of the deviation from normal of the controlled voltage. As was heretofore noted, this is accomplished through the use of a main driving motor, such as 22, whose speed is proportional to the magnitude of the energizing potential applied to its windings and by varying this motor energizing potential in proportion to the magnitude of the voltage deviation to be corrected. The greater the deviation from normal of the voltage on the lines $L_1$, $L_2$, the greater will be the energizing potential applied to the motor windings 26 and consequently the greater will be the speed of motor rotation.

Fig. 2 shows a modified form of voltage regulator system embodying the invention and which differs from that of Fig. 1 primarily in that a direct current motor 80 is used as a main driving motor instead of an alternating current motor like the motor 22 described above. This motor 80 includes the wound armature 81 and a field winding 82. As before, the system includes the ordinary constant ratio transformer 27 connected to load leads $L_1$, $L_2$ and a constant voltage transformer 31 which is energized from the same leads. The same reference numerals have been used to identify identical parts.

To adapt the system to a direct current motor, suitable rectifiers have been interposed in the circuit. For this purpose, a rectifier bridge 83, comprising four dry disk type rectifier elements in the respective arms of the bridge, has been connected across the output leads 37, 38 of the constant voltage transformer 31. Similarly, a rectifier bridge 84 of the same form has been connected across the output leads 41, 42 of the transformer 27. Load resistors 85, 86 are connected across respective output terminals of the rectifier bridges 83 and 84. The respective voltage drops across these resistors 85, 86 are in turn applied in opposition to each other across the motor armature 81. Thus, the positive terminals are interconnected by conductor 87 while the negative terminals are connected to the respective armature terminals through conductors 88, 89.

The motor field winding 82 is supplied from the lines $L_1$, $L_2$ through a transformer 90 and a four arm rectifier bridge 91. The energizing circuit and field winding are so proportioned that the magnetic circuit of the latter will be maintained substantially saturated through any likely range of voltage of the lines $L_1$, $L_2$ so that changes in this controlled voltage will not cause any variations in effective field strength.

In the system of Fig. 2, it will be seen that when the controlled voltage on the lines $L_1$, $L_2$ is normal, the outputs of the transformers 27 and 31 will be balanced so that the motor 80 remains at rest. In the event that the controlled voltage rises above normal, the drop across the resistor 86 will exceed that of the resistor 85 so that the motor 80 will be caused to rotate in one direction. Similarly, when the controlled voltage drops below normal, the voltage drop across the resistor 85 will preponderate and the motor 80 will rotate in the opposite direction. In other words, the main driving motor 80 is rotated in one direction or the other depending upon the sense of the deviation from normal for the controlled voltage just as in the case of the motor 22 for the system of Fig. 1. The main driving motor 80 can, of course be connected to a desired voltage control or changing device through any suitable means such, for example as that exemplified in Fig. 1.

I claim as my invention:

1. A voltage regulator system for an alternating current network comprising, in combination, an adjustable voltage control device connected to the network and operable upon adjustment in opposite senses correspondingly to raise and lower the voltage in the network, means including a reversible electric motor for adjusting the setting of said control device in opposite senses depending upon the direction of motor rotation, said motor including a quadrature winding and a normally energized main winding, the direction of motor rotation being dependent on the phase relation between the voltage on the main winding and an energizing potential applied to said quadrature winding, means including a non-saturated core transformer energized from the network for producing an output potential proportional to that being regulated in the network, means including a second transformer energized from the network for producing an output potential of constant value irrespective of fluctuations in the network voltage and of a value equal to said output potential of said first transformer when the network voltage is at a predetermined normal value, and means connecting the outputs of said first and second transformers in phase opposition and for applying the algebraic sum thereof as an energizing potential to said quadrature winding, whereby said last-mentioned energizing potential is linearly proportional to the difference between the network voltage being regulated and said constant value potential.

2. A voltage regulator system for an alternating current network comprising, in combination, an adjustable voltage control device connected to the network and operable upon adjustment in opposite senses correspondingly to raise and lower the voltage in the network, means including a reversible electric motor for adjusting the setting of said control device in opposite senses depending on the direction of motor rotation, said motor including a quadrature winding and a normally energized main winding, the direction of motor rotation being dependent upon the phase relation between the voltage on the main winding and an energizing potential applied to said quadrature winding, and means for supplying an energizing potential to said quadrature winding which is linearly proportional to the difference between the voltage being regulated and a preselected fixed value and which is comprised of two components substantially opposed in instantaneous polarity and proportional respectively to the value of the voltage being regulated and to said preselected fixed value which the regulating system is to maintain.

3. A voltage regulator system for an alternating current network comprising, in combination, an adjustable voltage control device connected to the network and operable upon adjustment in opposite senses correspondingly to raise and lower the voltage in the network, means including a reversible electric motor for adjusting the setting of said control device in opposite senses depending upon the direction of motor rotation, means including a non-saturated core transformer energized from the network for producing an output potential proportional to that being regulated in the network, means including a second transformer energized from the network for producing an output potential of constant value irrespective of fluctuations in the network voltage and of a value equal to said output potential of said first transformer when the network voltage is at a predetermined normal value, and means for connecting the outputs of said first and second transformers in phase opposition and applying the difference between the same as an energizing potential to said motor, whereby said last-mentioned energizing potential is linearly proportional to the difference between the network voltage being regulated and said constant value potential.

4. In a voltage regulator system, the combination with an adjustable voltage control device and means including a reversible electric motor for adjusting the setting of the same in opposite senses depending upon the direction of motor rotation, of means for supplying an energizing potential to the motor which is linearly proportional to the deviation of the controlled voltage from a preselected value and which is comprised of two components substantially opposed in instantaneous polarity and proportional respectively to the value of the voltage being regulated and to said preselected fixed value at which the regulating system is to maintain said regulated voltage.

5. In a voltage regulator system for an alternating current network, the combination of a voltage control device adjustable alternatively in opposite senses from a neutral position for respectively raising and lowering the voltage in the network, means including an alternating current reversible electric driving motor of the type comprising a main winding and a quadrature winding for adjusting the setting of said control device, the direction of rotation for said motor being dependent upon whether the potential applied to its quadrature winding leads or lags that applied to its main winding, a first transformer having output and input terminals, the latter being connected to the controlled network to produce a first potential at said output terminals proportional to the controlled voltage in the network, a resistor connected across said output terminals, means including a second transformer having output and input terminals for producing a second potential of fixed value and equal to the voltage drop across said resistor when the controlled voltage in the network is at its selected normal value, means for bringing the voltage drop across said resistor into time phase with the output potential of said second transformer, and means for connecting the output of said second transformer in phase opposition to the voltage drop across said resistor and applying the algebraic sum of said voltage drop and said second potential as an energizing potential to said motor's quadrature winding.

6. In a voltage regulator system, the combination of a reversible electric motor, means for supplying an energizing potential to said motor which is linearly proportional to the deviation between the controlled voltage and a preselected value and which is comprised of two components substantially opposed in instantaneous polarity and proportional respectively to the value of the voltage being regulated and to a preselected fixed value at which the regulating system is to maintain said regulated voltage, whereby to energize the motor for rotation in one direction or the other depending upon which of said components is preponderant and for rotation of such motor at a speed proportional to the magnitude of said deviation, an adjustable voltage control device, and means including a time delay mechanism for associating said motor with said control device to adjust the setting of the latter only after rotation of said motor through a preselected angular distance.

7. In a voltage regulating system for an alternating current network, the combination of a reversible direct current motor for actuating an associated voltage regulating device and having an energizing winding, the direction of motor rotation being dependent upon the polarity of a potential supplied to such winding, a first transformer energized from the network for supplying an output potential varying in proportion to changes in the network voltage, a second transformer energized from the network for supplying a second output potential of fixed value irrespective of fluctuations in the network voltage, and means for rectifying said first and second output potentials and applying the rectified potentials in voltage opposition to said motor energizing winding.

8. In a voltage regulating system for an alternating current network, the combination of a reversible direct current motor for actuating an associated voltage control device and having field and armature windings, a first transformer energized from the network for supplying an output potential varying in proportion to changes in the network voltage, a second transformer energized from the network for supplying a second output potential of fixed value irrespective of fluctuations in network voltage, means for rectifying said first and second output potentials and applying the rectified potentials in voltage opposition to one of said motor windings, and means including a rectifier supplied from the network for energizing the other of said motor windings to a degree sufficient substantially to saturate the associated magnetic structure of the motor throughout a wide range of voltage fluctuation on the network.

9. In a voltage regulating system for an alternating current network, the combination of a reversible direct current motor for actuating an associated voltage regulating device and having an energizing winding, the direction of motor rotation being dependent upon the polarity of a potential supplied to such winding, a transformer energized from the network for supplying an output potential varying in proportion to the changes in the network voltage, means for supplying a direct current potential of fixed magnitude and polarity, and means for rectifying said transformer output potential and applying the rectified potential as well as said fixed potential in voltage opposition to said motor winding.

10. A voltage regulator system for an alternating current network having, in combination, two non-saturated core transformers energized from said network and having secondaries connected in opposition and respectively providing constant and variable voltage outputs, where the net output voltage from said two transformers is linearly proportional to said deviations, a reversible electric motor selectively operable in opposite directions in response to deviations of said net output voltage of said transformers in opposite senses from a predetermined value, and a voltage regulating means controlled by said motor.

11. A voltage regulator system for an alternating current network having, in combination, two non-saturated core transformers energized from said network and having secondaries connected in opposition and respectively providing constant and variable voltage outputs, whereby the net output voltage from said transformers is linearly proportional to the difference between the network voltage and the constant voltage, a reversible electric motor energized directly from said secondaries and operable selectively in opposite directions, and a voltage regulator controlled by said motor.

12. In a voltage regulator system for an alternating current network, the combination of a voltage control device adjustable in opposite directions from a neutral position for respectively raising and lowering the voltage which it controls, actuating means including a reversible electric motor for adjusting the setting of said control device, two transformers energized from said network and having secondaries connected in opposition and respectively providing constant and variable voltage outputs, means for applying the difference between said outputs to said motor whereby to cause rotation of the latter in a direction to adjust the setting of said control device in a sense to restore the controlled voltage to normal, and means including a second reversible electric motor for restoring said actuating means to its initial position upon restoration of the controlled voltage to normal.

13. In a voltage regulator system for an alternating current network, the combination of a voltage control device adjustable in opposite directions from a neutral position for respectively raising and lowering the voltage which it controls, means including a reversible electric motor for adjusting the setting of said control device, two transformers energized from said network and having secondaries connected in opposition and respectively providing constant and variable voltages, means for applying the resultant of said voltages to said motor for causing rotation thereof in a direction to adjust the setting of said control device in a sense to restore the controlled voltage to normal, a second reversible electric motor mechanically coupled to the first mentioned motor but capable of exerting a torque normally less than that developed by said first motor, and means operable upon movement of said control device from neutral for energizing said second motor in a sense to restore the first mentioned motor to its initial position.

EDGAR D. LILJA.